April 27, 1954     T. F. SARAH     2,676,769
SPINNING REEL

Filed July 23, 1953                                 4 Sheets-Sheet 1

INVENTOR.
THOMAS F. SARAH
BY
Ely, Frye & Hamilton
ATTYS.

April 27, 1954

T. F. SARAH 2,676,769

SPINNING REEL

Filed July 23, 1953

INVENTOR.
THOMAS F. SARAH
BY
Ely, Frye & Hamilton
ATTYS

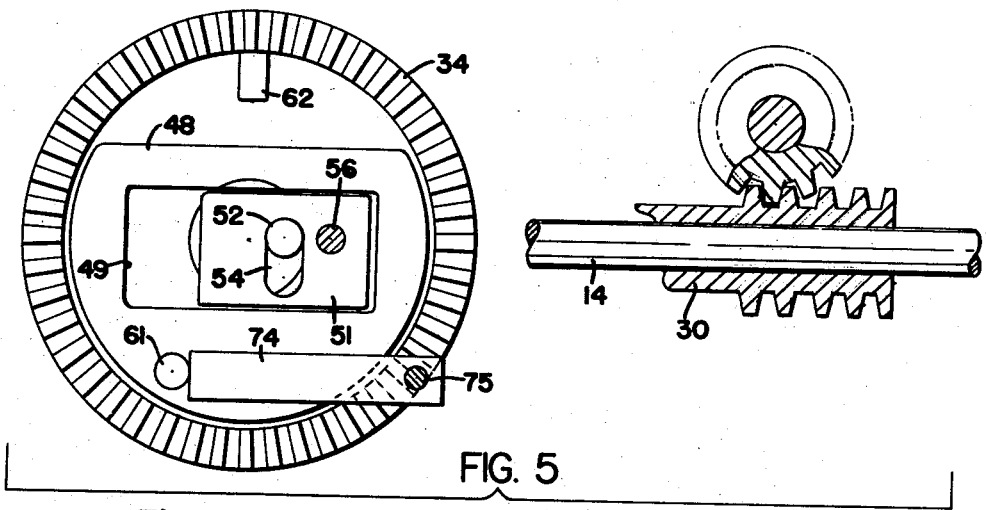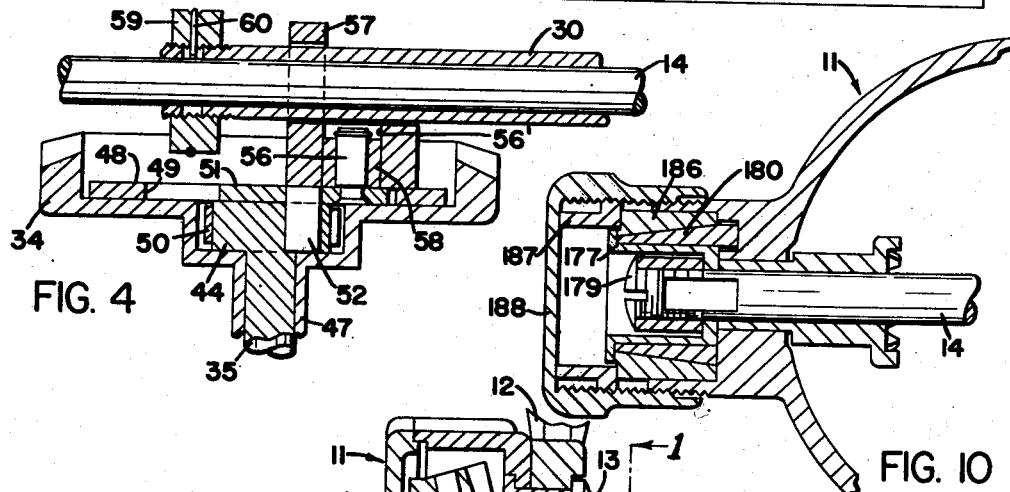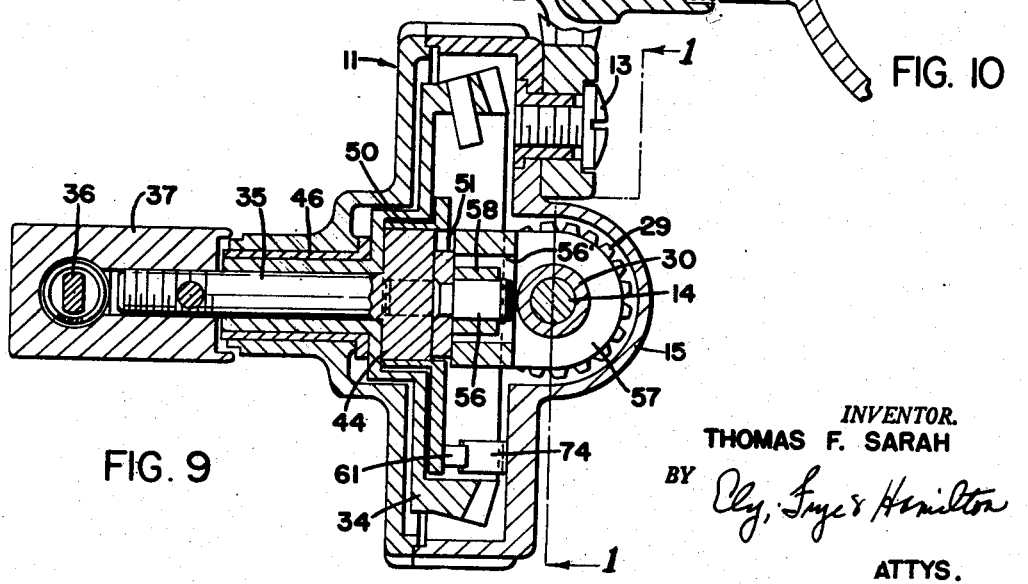

April 27, 1954 T. F. SARAH 2,676,769
SPINNING REEL
Filed July 23, 1953 4 Sheets-Sheet 4

INVENTOR.
THOMAS F. SARAH
BY
ATTYS.

Patented Apr. 27, 1954

2,676,769

UNITED STATES PATENT OFFICE 2,676,769

SPINNING REEL

Thomas F. Sarah, Akron, Ohio, assignor to The Enterprise Manufacturing Company, Akron, Ohio, a corporation of Ohio Application July 23, 1953, Serial No. 369,839

16 Claims. (Cl. 242—84.4)

The invention relates to fishing reels having a line drum or spool which does not rotate during the bait casting operation but allows line to pay out from the spool. In such reels when the line is retrieved a pick-up arm guides the line onto the spool and either the pick-up or the spool may be rotated to wind the line on the spool.

Certain prior constructions of spinning reels have a pick-up arm which guides the line onto the spool during the winding operation, but in order to prepare for the casting operation it is necessary to hold the line with the index finger of the hand holding the rod, while the pick-up arm is manually swung through approximately 180° to a remote or out-of-the-way position with respect to the spool. The line is usually light colored and of fine nylon, so that it is difficult to see and to feel, especially under adverse weather conditions, and may slip off the finger before the cast is made. Moreover, the operation of manually swinging the pick-up out of the way at the start of each cast occupies both hands and requires a certain amount of time and practice because the pick-up arm may not be at the same relative position each time the line is wound.

It is an object of the present invention to provide an improved spinning reel which does not require manually swinging the pick-up or guide arm at the start of a cast.

Another object is to provide an improved spinning reel in which the line is held in casting position by holding the line guide instead of the line.

A further object is to provide an improved spinning reel in which the guide arm is automatically positioned in line guiding position during the initial part of the winding operation, and is automatically located in the same relative position convenient for holding with the finger at the end of each winding operation.

Another object is to provide improved mechanism for oscillating the guide arm to level wind the line on the spool during the winding operation.

Another object is to provide a spinning reel having an improved and simplified construction which is easily operated with a minimum amount of skill and practice and does not tend to foul or entangle the line.

These and other objects are attained by the parts, constructions and combinations which comprise the present invention, a preferred embodiment of which is shown by way of example in the accompanying drawings, and described in detail herein. Various modifications and changes in details of construction may be made within the scope of the invention as defined in the appended claims.

In the drawings:

Fig. 4 is a view similar to Fig. 2 showing the crank mechanism in casting postion;

Fig. 5 is a plan sectional view thereof similar to Fig. 3;

Fig. 9 is a transverse sectional view on line 9—9, Fig. 1; and

Fig. 10 is a fragmentary sectional view, similar to Fig. 1 showing a modified form of brake.

Figure 1:
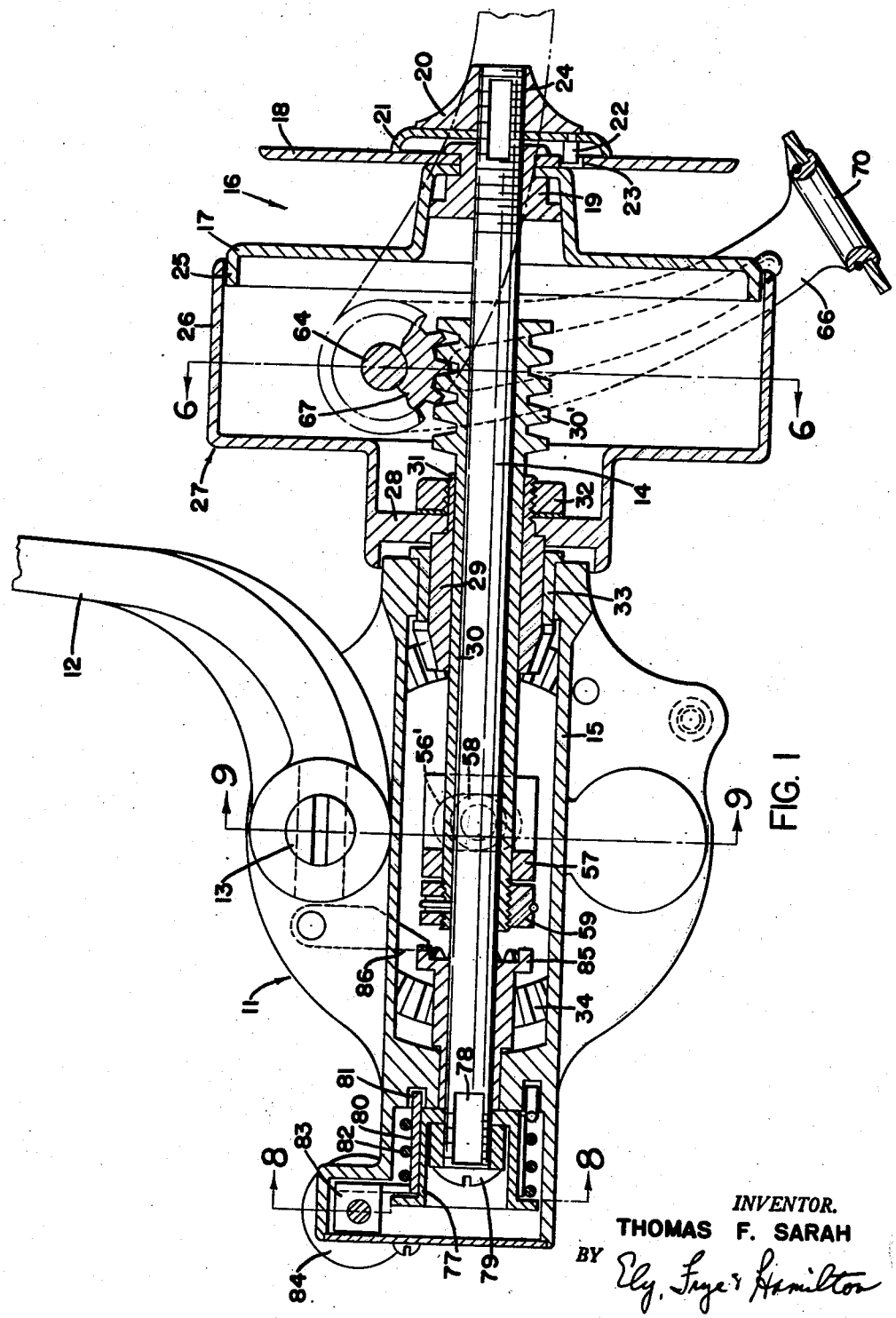
Fig. 1 is a sectional view of the improved reel taken on line 1—1, Fig. 9, along the spool axis, with the guide arm in winding postion.

Referring to Fig. 1, the reel housing indicated generally at 11 has the usual bracket arm 12 secured thereto by a screw 13 for attaching the reel to a rod (not shown), the rod being parallel to the spool shaft 14, which is mounted in a rounded portion 15 on the side of the housing opposite to the crank handle. (See Fig. 9.) The shaft 14 is normally non-rotatable and has the spool 16 fixed on its outer end. The inner and outer spool flanges 17 and 18 respectively, are seated in a groove in a nut 19 which is screwed on the shaft.

A lock nut 20 is screwed on the outer end of the shaft for holding the spool in adjusted position on the shaft. A cupped washer 21 is interposed between the nuts 19 and 20 and has an inwardly projecting pin 22 which is entered in one of a circular series of holes 23 in the outer spool flange 18, the washer being non-rotatably mounted on the flatted portion 24 of shaft 14. In order to adjust the spool axially on shaft 14 and relative to the line guide which is mounted on the shaft, lock nut 20 and washer 21 are removed and the spool and nut turned in or out on the shaft, after which the washer 21 is replaced on its pin 22 entered in one of the holes.

The inner spool flange 17 has an inturned lip 25 which is telescopically received within the outer annular flange 26 of a rotatable carrier or flyer 27 which carries the bale or line guide. The flyer has a rear wall 28 secured to a beveled pinion gear 29 which is journaled on a rack sleeve 30 slidable axially on shaft 14. Preferably, the pinion has a flatted shank 31 on which the flyer wall 28 is mounted, and a nut 32 screwed on the shank clamps the pinion to the flyer wall. The pinion 29 is journaled in a bushing 33 mounted in the end of the housing portion 15 so that rotation of the pinion will rotate the flyer 27 around the spool 16 which is fixed on shaft 14.

Figure 2:
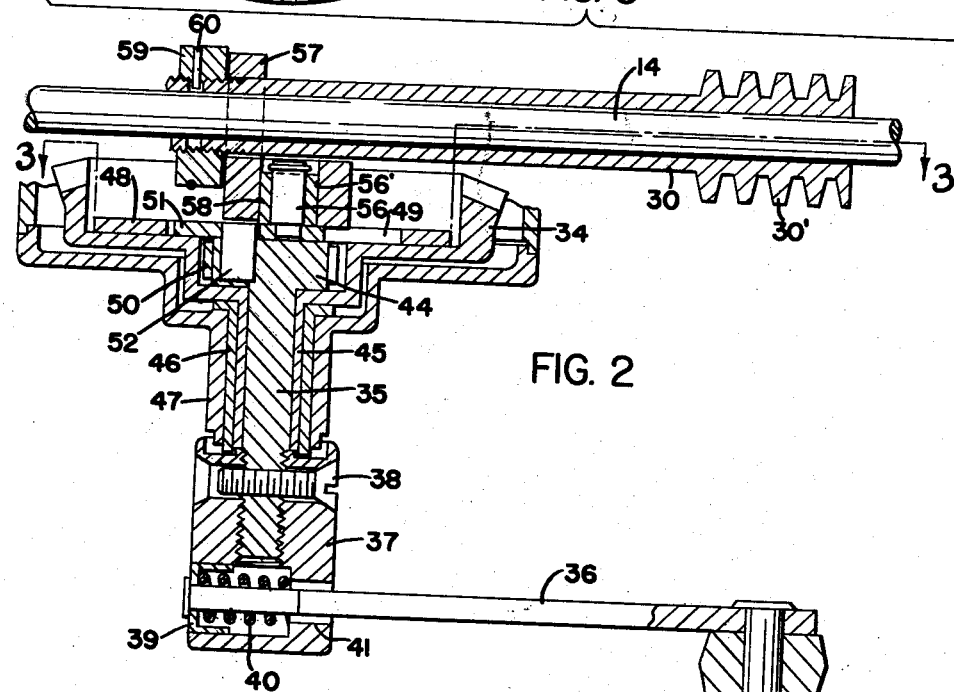
Fig. 2 is a fragmentary sectional view at right angles to Fig. 1, as on line 2—2, Fig. 3, showing the crank mechanism in line winding position.

The pinion 29 meshes with a beveled gear 34 mounted in the housing 11 at right angles to the spool shaft on a crank shaft 35 on the outer end of which is secured a crank handle 36 (Fig. 2). Preferably, the handle is mounted in the end of a nut member 37 which is screwed on the outer end of shaft 35 and then locked in position with a screw 38 which is threaded transversely through the shaft. The handle 36 has a cap 39 on its inner end slidable in a transverse bore in the nut member 37, and a spring 40 is interposed between the cap and the inner end of the bore. As shown in Fig. 9, the handle is rectangular in cross section, and it is normally engaged in a slot 41 in nut member 37 for turning the nut and shaft. The inner end of the handle within the bore is reduced in cross section so that it will turn within slot 41. By pulling outwardly on the handle to compress the spring 40, the reduced section of the handle is entered in slot 41 so that the handle can be turned through 180° to turn the knob 42 in a convenient position for packing or storing.

The inner end of crank shaft 35 has a cam 44 formed thereon which is movably mounted in the hollow shank hub of gear 34, and the gear has a bushing 46 secured in a sleeve 45 journaled in a bushing 46 secured in a sleeve portion 47 of the housing 11. A drive plate 48 is movably supported on the bottom wall of the gear within the gear teeth and has a rectangular opening 49 extending over the cam 44. A split ring 50 having one portion secured to the under side of plate 48, projects into the hub of the ring gear and resiliently frictionally grips the outer surface of the cam plate 44.

A cam slide plate 51 fits slidably in the opening 49 of the drive plate. The slide plate 51 is rectangular and in width is only slightly less than the width of the opening 49, but is substantially shorter in length so that the plate can slide lengthwise in the slot. A cam pin 52 is secured in cam 44 eccentrically of shaft 35 and projects upwardly therefrom into a transverse slot 54 in plate 51. A cam roller pin 55 is secured in the slide plate 51 and projects upwardly therefrom into a slot 56' in the bottom of a yoke 57 slidably mounted on the rack sleeve 30. Preferably, a roller 58 is mounted on the pin 55 within the yoke to reduce wear.

Figure 3:
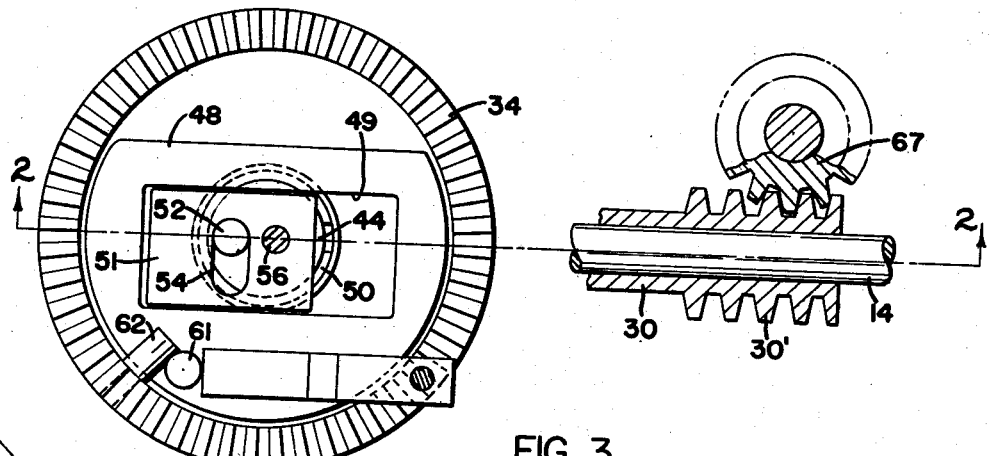
Fig. 3 is a plan sectional view, partly broken away, as on line 3—3, Fig. 2.

A stop nut 59 having a retainer ring 60 thereon is screwed on the end of rack sleeve 30, and in the line winding position of Figs. 1, 2 and 3, with the yoke abutting the stop nut, the pin 55 is located slightly eccentric of the axis of crank shaft 35. Thus, as the crank shaft is rotated clockwise as viewed in Fig. 3, the pin 52 drives slide plate 51 and rotates drive plate 48, and an upstanding pin 61 on the drive plate engages the radial pin 62 on the gear to drive the gear and the pinion 29 and carrier 27.

Figure 7:
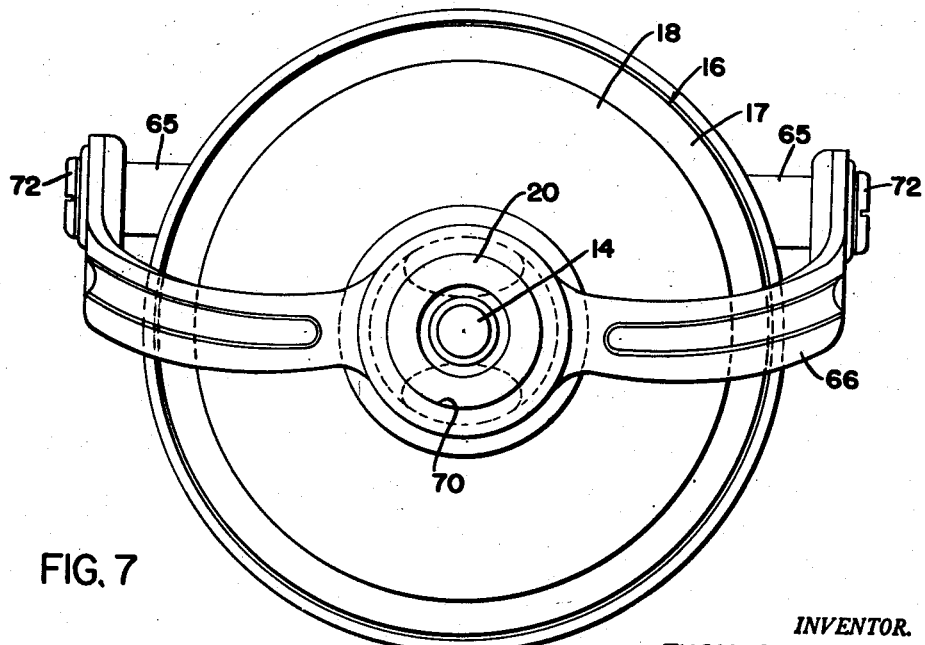
Fig. 7 is an elevation looking toward the spool end of the reel, with the line guide in casting position.

A shaft 64 is journaled in the carrier 27 crosswise of the spool shaft 14 and laterally offset therefrom. The shaft is preferably journaled in bearing sleeves 65 in the carrier wall, and the arcuate bale or line guide 66 is mounted on the projecting ends of the shaft. Within the carrier, a pinion 67 is secured on the shaft 64 by a set screw 68, and one end of a torsion spring 69 engirdling the shaft is secured in the pinion, the other end bearing against the bottom wall of the carrier. The spring 69 tends to rotate the pinion in a counterclockwise direction, as viewed in Figs. 1 and 3, urging the bale 66 toward the dot-dash position of Fig. 1 where the eye 70 of the bale is axial of the spool shaft in casting position, as seen in Fig. 7. In the winding position the bale is held in the full line position of Fig. 1 for guiding the line onto the spool, by the engagement of the rack teeth 30' with the pinion 67, the rack being held in position by abutment of the yoke 57 with stop nut 59. As shown, the ends of the bale 66 may be seated in bushings 71 secured on the ends of shaft 64 by screws 72.

The line always passes from the end of the rod through the eye 70 of the bale 66, and in winding the line on the spool 16 the line is guided by the eye onto the spool. Due to the slightly offset or eccentric position of cam roller 58 with respect to the crank shaft, as the crank is rotated the roller working in slot 56' will reciprocate the rack sleeve slightly and cause a rocking motion of the bale. The amount of rocking is calculated so as to level wind the line on the spool 16.

In order to place the reel in casting position at the end of the winding operation, the crank is rotated reversely one-half to one and one-half turns. Referring to Figs. 4 and 5, when the crank shaft 35 is rotated counterclockwise, the pin 61 on drive plate 48 moves away from pin 62 and the plate rotates counterclockwise until the pin 61 engages the end of a spring arm 74, the other end of which is secured by a screw or the like 75 to the inner surface of the housing. As shown in Fig. 9, the free end of the spring arm 74 is bent inwardly from the housing to engage the pin when it is rotated toward the free end of the arm. When the plate 48 is rotated in the opposite direction to wind the line, the pin snaps over the arm due to its resiliency. It will be apparent from Fig. 5 that the arm 74 is positioned so that when the reversely rotating pin 61 engages the end of the arm the slot is aligned longitudinally with the spool shaft so that movement of the cam slide 51 in the slot 49 will move the yoke 57 along the rack sleeve 30.

After the pin 61 has engaged arm 74, further reverse rotation of the crank shaft will cause the cam 44 to turn within the split ring 50, since the drive plate attached to the ring is prevented from rotating. As the cam turns through 180° the pin 52 will move the slide 51 in slot 49 from the position of Fig. 3 to the position of Fig. 5, moving the pin 56 and the yoke 57 to the right.

In thus preparing the reel for casting the fisherman extends the index finger of his right hand which is holding the rod in a usual position just over the reel, and holds the bale 66 in the line guiding position as he reversely rotates the crank one-half turn or slightly more, as previously described. Then when the slide plate 51 has shifted the yoke to the position of Fig. 4, the yoke will be spaced from the stop nut 59, because the nut is held in the position of Fig. 1, as the result of the bale being held in guiding position by the finger of the fisherman. Now as the cast is made the finger is released and the spring 69 acts on pinion 67 to snap the bale to the axial or casting position of Fig. 7, where the stop nut 59 abuts the yoke 57 in its position of Fig. 4.

Figure 8:
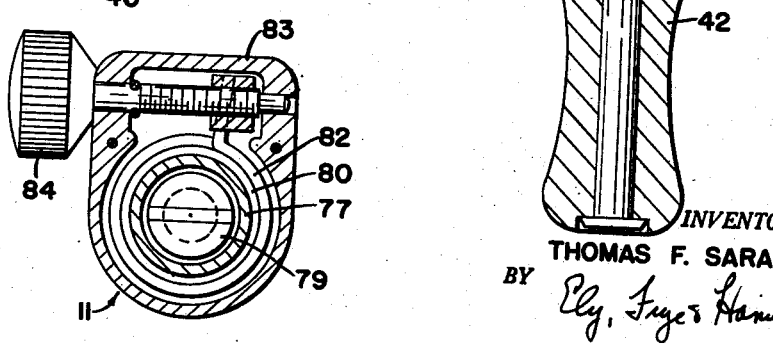
Fig. 8 is a transverse section through the brake mechanism, on line 8—8, Fig. 1.
Figure 6:
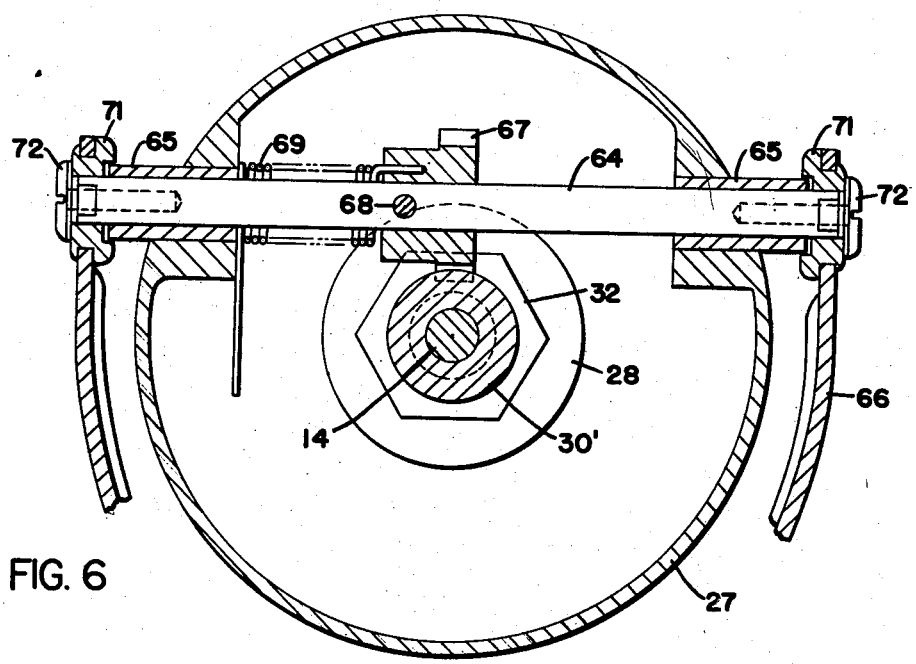
Fig. 6 is a transverse sectional view as on line 6—6, Fig. 1.

Referring to Figs. 1 and 8, a friction brake is provided at the rear end of shaft 14 for allowing the shaft to turn when the pull on the line exceeds a predetermined amount, so as to prevent breaking of the line. The brake includes a brake drum 77 non-rotatably secured on the flatted end portion 78 of the shaft by a screw 79. A brake shoe in the form of a split nylon sleeve 80 surrounds the drum and has a projection 81 entered into a recess in the housing preventing turning of the sleeve. A torsion spring 82 surrounding said sleeve frictionally clamps the sleeve against the drum, the inner end of the spring being anchored in the housing and the outer end secured in a nut 83 threaded on an adjustment screw 84. Thus turning the nut 84 adjusts the amount of drag on the brake.

A click or ratchet device is preferably provided to warn the fisherman when the drag or pull on the line is sufficient to overcome the friction of the brake, so that he will not continue to reel in the line. Such device may consist of a toothed ratchet wheel 85 secured on the spool shaft preferably near its rear end, and engaged by the end of a spring arm 86 mounted on the housing 11.

A modified form of brake is shown in Fig. 10 in which the brake drum 177 is secured on the end of shaft 14 by a screw 179, and the nylon sleeve 180 is tapered or wedge-shaped in cross section. The sleeve 180 is engirdled by a sleeve of "neoprene" 186 or the like which mates or dovetails with sleeve 180 and has its outer surface confined within the housing. A metal bushing 187 abuts the end of sleeve 186 and a cap 188 covering the bushing is screwed on the housing for wedging the sleeve 186 over the brake sleeve 180 to apply a predetermined amount of drag to the brake.

In the operation of the improved spinning reel, the fisherman first sets his bait adjacent the tip of his rod in the position he desires for casting, and then manually turns the carrier to locate the bale in a position convenient to be held by the finger of his right hand. Thereafter, each time the line is wound to bring the bait to the same location relative to the tip of the rod, the bale will return to the same relative position to be held by the finger as the crank is reversed in readiness for the next cast. When the crank is reversed to bring the drive pin 61 against the spring arm 74 and then continued through one-half turn, the yoke 57 is in the position of Fig. 4, and as the cast is made the finger is released from the bale allowing it to spring out to the axial or casting position of Fig. 7.

Thus the line always runs through the guiding eye 70 of the bale, both in the casting and winding positions thereof, so that there is no chance of the line becoming caught on projections of the reel or becoming fouled in any way. Accordingly, it is not necessary for the fisherman to depend on the observation and feel of the line itself, because he needs only to finger the bale which is much easier and requires less skill to manipulate. Nor is it necessary to manually swing the bale out of the way at the start of a cast because the reversal of the crank automatically places the reel in condition for casting without shifting the hand from the crank handle, making the preparation for the cast quicker and less awkward.

What is claimed is:

1. In a spinning reel having a spool shaft, a spool fixed on the shaft, a carrier rotatably mounted on said shaft, a pinion for driving said carrier, and a gear meshing with said pinion, a bale rockably mounted on said carrier on an axis transverse to said spool shaft, a line guiding eye in the central portion of said bale, means longitudinally slidable on said spool shaft operatively connected to said bale for rocking said bale, and eccentric means on said gear operatively connecting said gear to said bale rocking means for rocking said bale to level wind the line on the spool as the gear rotates the carrier to wind the line.

2. In a spinning reel having a spool shaft, a spool fixed on the shaft, a carrier rotatably mounted on said shaft, a pinion for driving said carrier, and a gear meshing with said pinion, a bale rockably mounted on said carrier on an axis transverse to said spool shaft, a line guiding eye in the central portion of said bale, a sleeve longitudinally slidable on said spool shaft and operatively connected to said bale for rocking said bale, and eccentric means on said gear operatively connecting said gear to said sleeve for rocking said bale to level wind the line on the spool as the gear rotates the carrier to wind the line.

3. In a spinning reel having a spool shaft, a spool fixed on the shaft, a carrier rotatably mounted on said shaft, a pinion for driving said carrier, and a gear meshing with said pinion, a bale rockably mounted on said carrier on an axis transverse to said spool shaft, a line guiding eye in the central portion of said bale, a sleeve longitudinally slidable on said spool shaft and operatively connected to said bale for rocking said bale, a yoke on said sleeve, and an ecentric pin on said gear operatively connected to said yoke for rocking said bale to level wind the line on the spool as the gear rotates the carrier to wind the line.

4. In a spinning reel having a spool shaft, a spool fixed on the shaft, a carrier rotatably mounted on said shaft, a pinion for driving said carrier, and a gear meshing with said pinion, a transverse shaft journaled in the carrier offset from said spool shaft, a bale mounted on said transverse shaft, a line guiding eye in the central portion of said bale, a second pinion on said bale shaft, a sleeve longitudinally slidable on said spool shaft and having a rack meshing with said second pinion, and eccentric means on said gear operatively connecting said gear to said sleeve for reciprocating the sleeve and rocking the bale to level wind the line on the spool as the gear rotates the carrier to wind the line.

5. In a spinning reel having a housing, a spool shaft mounted in the housing, a spool fixed on one end of the shaft, a carrier rotatably mounted on said shaft adjacent to the spool, a pinion journaled in said housing and connected to said carrier, and a gear in said housing meshing with said pinion, a bale rockably mounted on said carrier on an axis transverse to said spool shaft, a line guiding eye in the central portion of said bale, means longitudinally slidable on said spool shaft operatively connected to said bale for rocking said bale, eccentric means on said gear connected to said bale rocking means for rocking the bale to level wind the line on the spool as the gear rotates the carrier to wind the line, and friction brake means on the other end of the spool shaft for placing a predetermined amount of drag on the shaft against turning in the housing.

6. In a spinning reel having a housing, a spool shaft mounted in the housing, a spool fixed on one end of the shaft, a carrier rotatably mounted on said shaft adjacent to the spool, a pinion journaled in said housing and connected to said carrier, and a gear in said housing meshing with said pinion, a bale rockably mounted on said carrier on an axis transverse to said spool shaft, a line guiding eye in the central portion of said bale, means longitudinally slidable on said spool shaft operatively connected to said bale for rocking said bale, eccentric means on said gear connected to said bale rocking means for rocking the bale to level wind the line on the spool as the gear rotates the carrier to wind the line, and friction brake means on the other end of the spool shaft for placing a predetermined amount of drag on the shaft against turning in the housing, said brake means including a brake drum on the shaft, a brake sleeve engirdling the drum and fixed in the housing, and means yieldingly frictionally clamping the sleeve around the drum.

7. In a spinning reel having a spool shaft, a spool fixed on the shaft, a carrier rotatably mounted on said shaft, a pinion for driving said carrier, and a gear meshing with said pinion, a bale rockably mounted on said carrier on an axis transverse to said spool shaft, a line guiding eye in the central portion of said bale, means longitudinally slidable on said spool shaft operatively connected to said bale for rocking said bale, a cam plate slidable on said gear longitudinally of said spool shaft, an eccentric on said plate operatively connected to said bale rocking means for rocking the bale to level wind the line on the spool as the gear rotates the carrier to wind the line, and means operated by reversing the gear to shift the cam plate and swing the bale to position the eye axially of the spool shaft in readiness for casting.

8. In a spinning reel having a spool shaft, a spool fixed on the shaft, a carrier rotatably mounted on said shaft, a pinion for driving said carrier, and a gear meshing with said pinion, a bale rockably mounted on said carrier on an axis transverse to said spool shaft, a line guiding eye in the central portion of said bale, means longitudinally slidable on said spool shaft operatively connected to said bale for rocking said bale, a cam plate slidable on said gear longitudinally of said spool shaft, an eccentric on said plate operatively connected to said bale rocking means for rocking the bale to level wind the line on the spool as the gear rotates the carrier to wind the line, and means operated by reversing the gear first to align said cam plate longitudinally of said spool shaft and then to shift the cam plate and swing the bale with its eye axially of the spool shaft in readiness for casting.

9. In a spinning reel having a spool shaft, a spool fixed on the shaft, a carrier rotatably mounted on said shaft, a pinion for driving said carrier, and a gear meshing with said pinion, a bale rockably mounted on said carrier on an axis transverse to said spool shaft, a line guiding eye in the central portion of said bale, spring means urging the bale to casting position with its eye axially of said spool shaft, a sleeve longitudinally slidable on said spool shaft operatively connected to said bale swinging it on its axis, a stop on the end of said seeve, a yoke slidable on said sleeve normally abutting said stop, a cam plate slidable on said gear longitudinally of said spool shaft, an eccentric on said plate connected to said yoke for rocking the bale in winding position to level wind the line on the spool as the gear rotates the carrier to wind the line, and means operated by reversing rotation of the gear to shift the cam plate and yoke to a position where the spring means will swing the bale when released to casting position with the stop against the yoke.

10. In a spinning reel having a spool shaft, a spool fixed on the shaft, a carrier rotatably mounted on said shaft, a pinion for driving said carrier, and a gear meshing with said pinion, a bale rockably mounted on said carrier on an axis transverse to said spool shaft, a line guiding eye in the central portion of said bale, spring means urging the bale to casting position with its eye axially of said spool shaft, a sleeve longitudinally slidable on said spool shaft operatively connected to said bale swinging it on its axis, a stop on the end of said sleeve, a yoke slidable on said sleeve normally abutting said stop, a cam plate slidable on said gear longitudinally of said spool shaft, an eccentric on said plate connected to said yoke for rocking the bale in winding position to level wind the line on the spool as the gear rotates the carrier to wind the line, means operated by reversing rotation of the gear to align said cam plate longitudinally of said spool shaft, and means operated by further reverse rotation of said gear to shift the cam plate and yoke to a position where the spring means will swing the bale when released to casting position with the stop against the yoke.

11. In a spinning reel having a spool shaft, a spool fixed on the shaft, a carrier rotatably mounted on said shaft, a pinion for driving said carrier, and a gear meshing with said pinion, a bale rockably mounted on said carrier on an axis transverse to said spool shaft, a line guiding eye in the central portion of said bale, and eccentric means on the gear for rocking the bale with its eye over the side of the spool to level the line as the gear rotates the carrier to wind the line on the spool, said eccentric means being slidable on the gear by reversing rotation of the gear to swing the bale to casting position with its eye axially of said spool shaft.

12. In a spinning reel having a spool shaft, a spool fixed on the shaft, a carrier rotatably mounted on said shaft, a pinion for driving said carrier, and a gear meshing with said pinion, a bale rockably mounted on said carrier on an axis transverse to said spool shaft, a line guiding eye in the central portion of said bale, eccentric means on the gear for rocking the bale with its eye positioned over the side of the spool to level the line as the gear rotates the carrier to wind the line on the spool, said eccentric means being slidable on the gear in a direction longitudinal of said spool shaft, and means operable by reversing rotation of said gear to swing the bale to casting position with its eye axially of said spool shaft.

13. In a spinning reel having a coaxial spool and carrier rotatable relative to each other and a crank-operated gear for causing said relative rotation to wind a line on the spool, a bale rockably mounted on said carrier on a transverse axis and having a line guiding eye at its central portion, eccentric means slidably mounted on said gear for movement axially of said carrier and operatively associating said gear with said bale to oscillate the bale for leveling the line as it is wound on the spool, and means operated by reverse rotation of said gear to slide the eccentric means and swing the bale to casting position with its eye axially of said spool.

14. In a spinning reel having a coaxial spool and carrier rotatable relative to each other and a crank-operated gear for causing said relative rotation to wind a line on the spool, a bale rockably mounted on said carrier on a transverse axis and having a line guiding eye at its central portion, eccentric means slidably mounted on said gear and operatively associating said gear with said bale to oscillate the bale for leveling the line as it is wound on the spool, means operated by reverse rotation of the gear to align the eccentric means for sliding movement parallel to the axis of said carrier, and means operated by further reverse rotation of the gear to shift the eccentric means and swing the bale to casting position with its eye axially of the spool.

15. In a spinning reel having a shaft, a spool and carrier mounted on said shaft for rotation relative to each other, and a crank-operated gear for causing said relative rotation to wind a line on the spool, a bale rockably mounted on said carrier on an axis transverse to said shaft and having a line guiding eye at its central portion, a sleeve longitudinally slidable on said spool shaft and operatively connected to said bale, eccentric means slidable on said gear and connected to said sleeve for oscillating the bale to level the line as the gear is rotated to wind the line on the spool, and means operated by reverse rotation of said gear to slide the eccentric means and swing the bale to casting position with its eye axially of the spool.

16. In a spinning reel having a shaft, a spool and carrier mounted on said shaft for rotation relative to each other, and a crank-operated gear for causing said relative rotation to wind a line on the spool, a bale rockably mounted on said carrier on an axis transverse to said shaft and having a line guiding eye at its central portion, a sleeve longitudinally slidable on said spool shaft and operatively connected to said bale, eccentric means slidable on said gear and connected to said sleeve for oscillating the bale to level the line as the gear is rotated to wind the line on the spool, means operated by reverse rotation of said gear to align the eccentric means for sliding on the gear longitudinally of said spool shaft, and means operated by further reverse rotation of said gear to slide the eccentric means and swing the bale to casting position with its eye axially of the spool.

No references cited.